H. JOHNSON.
KETTLE LID.
APPLICATION FILED NOV. 13, 1914.
1,199,989.
Patented Oct. 3, 1916.
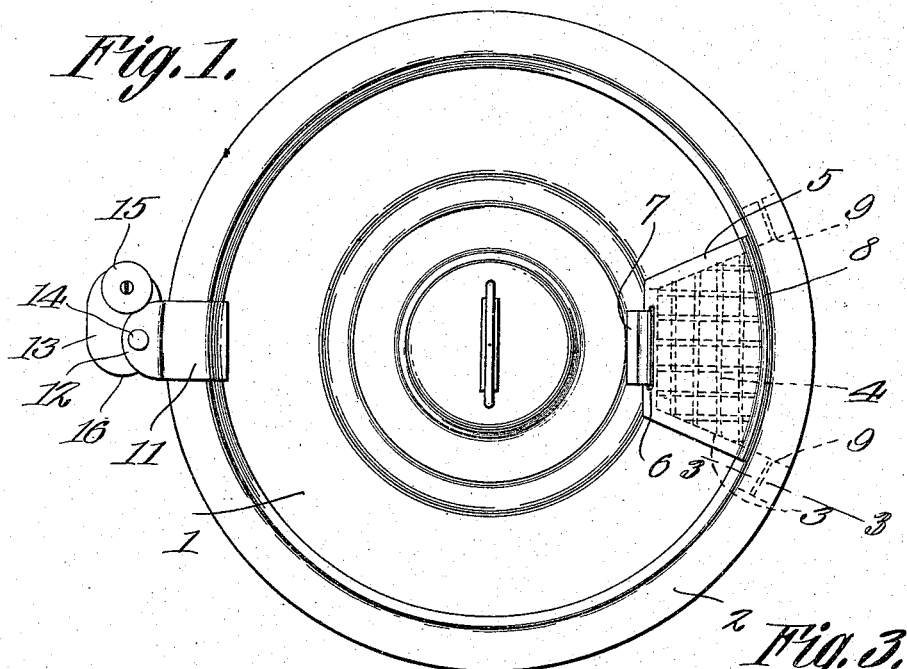
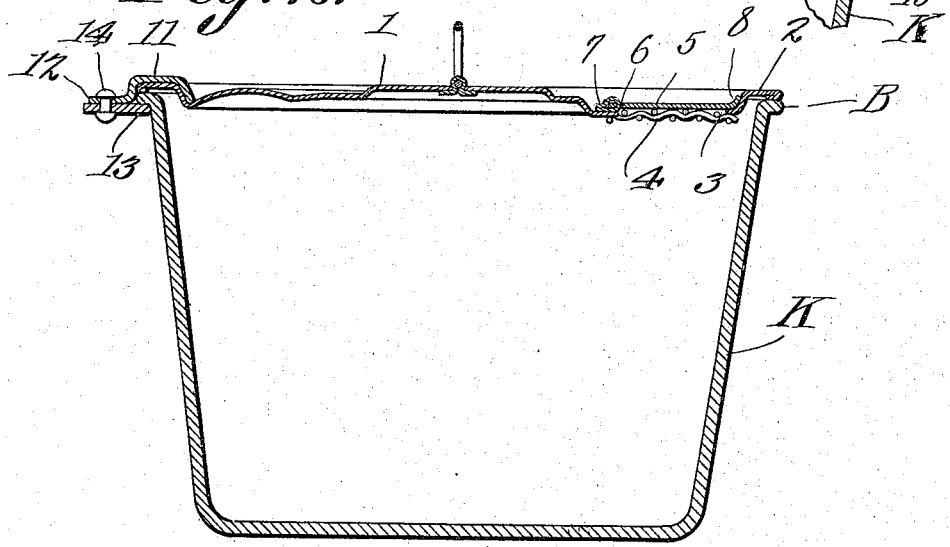
Witnesses
Henry Johnson, Inventor,
by C. A. Snow & Co.
Attorneys.

UNITED STATES PATENT OFFICE.

HENRY JOHNSON, OF BEATRICE, NEBRASKA.

KETTLE-LID.

1,199,989.  Specification of Letters Patent.  Patented Oct. 3, 1916.

Application filed November 13, 1914. Serial No. 871,950.

*To all whom it may concern:*

Be it known that I, HENRY JOHNSON, a citizen of the United States, residing at Beatrice, in the county of Gage and State of Nebraska, have invented a new and useful Kettle-Lid, of which the following is a specification.

The present invention appertains to lids or covers for kettles or other culinary vessels, and has for one of its objects, to provide a kettle lid or cover provided with novel means whereby the kettle may be readily drained while the lid is held in place thereon.

Another object of the invention is to provide novel means for clamping the lid over the mouth of the kettle or vessel.

It is also within the scope of the invention, to provide a kettle lid of the nature indicated, which is comparatively simple and inexpensive in construction, as well as being convenient, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:—

Figure 1 is a plan view of the improved kettle lid having the improvements applied thereto. Fig. 2 is a sectional view of the lid as applied to a kettle or vessel. Fig. 3 is a sectional detail on the line 3—3 of Fig. 1.

In the drawing, there is illustrated a circular lid or cover 1, which has its marginal portion 2 offset upwardly to enable the lid or cover 1 to fit snugly over the bead B surrounding the mouth of the kettle or vessel K.

In carrying out this invention, the lid 1 is provided with a pouring or draining opening 3 adjacent the marginal portion 2, and a strainer or sieve 4, preferably cut from metal screening, is soldered or otherwise secured to the bottom of the lid 1 so as to extend across the opening 3. A closure or flap valve 5 is provided for the opening 3, to normally close the said opening while the contents of the kettle are being cooked or boiled. The closure 5 is preferably cut or fashioned from a sheet metal blank, and is formed to fit snugly upon the lid 1 over the opening 3. The closure or valve 5 is provided at its basal portion, which is disposed innermost, with a slot 6, and a looped sheet metal piece 7 is engaged through the slot 6, and has its edges soldered or otherwise secured upon the lid 1 at a point spaced inwardly slightly from the opening 3. Thus, the closure 5 is pivoted or hinged to the lid at the inner side of the opening 3, to swing to and from the opening for the purpose of covering or uncovering the same. The outer free portion of the cover 5 is preferably turned or bent upwardly to provide a lip 8 adapted to snugly fit the marginal portion 2 of the lid when the closure 5 is swung downwardly to close the opening 3. The lip 9 also enables the closure 5 to be readily raised by the fingers, or by a knife or other suitable implement, when it is desired to look into the kettle through the opening 3.

The means for clamping or holding the lid 1 over the mouth of the kettle, embodies a pair of sheet metal pieces or members 9 soldered or otherwise secured to the bottom of the marginal portion 2 of the lid at the opposite sides of the opening 3 and having deflexed or downwardly bent portions 10 providing hooks engageable over the bead B of the kettle. The clamping means also embodies a sheet metal piece or member 11 soldered or otherwise secured upon the marginal portion 2 of the lid opposite the pieces 9 having the hooks 10, and the piece 11 projects beyond the margin of the lid, and has its outer or free portion offset downwardly, as at 12. An eccentric plate 13 is pivoted to the bottom of the free end 12 of the piece or member 11, by means of a rivet or other pivot member 14, and one end of the plate 13 is provided with a suitable knob or handle 15 for enabling the plate 13 to be readily swung by hand to locking or unlocking position. The other end of the plate 13 is curved to provide a cam 16, it being noted that one edge of the plate 13 is arranged relatively close to the pivot 14, while the other edge is spaced farther from the said pivot, so that the curved end or cam 16 which connects the edges of the plate 13, will enable the plate 13 to properly engage and disengage the bead B of the kettle.

To apply the lid 1 to the kettle, the eccentric or clamping plate 13 is swung to the position illustrated in Fig. 1, and the hooks 10 are engaged over the bead B of the kettle when the lid or cover is applied and seated upon the bead. The eccentric plate 13 is then swung so that the cam 16 engages under the bead B, which will clamp and hold the lid 1 tightly in place upon the kettle, so that the lid will not be accidentally opened or removed.

With the present lid, the water within the kettle may be readily drained off, by properly tilting the kettle with the opening 3 of the lid lowermost, which will enable the kettle to be drained, in a convenient manner, and without danger of spilling the solid contents of the kettle, since the sieve or strainer 4 will retain them within the kettle. When the kettle is tilted to drain the same, the closure or valve 5 will swing open away from the lid, and it is not necessary to manually open the closure 5 when the kettle is to be drained.

The cardinal features of the invention reside in the fact that with the present device, the lid may be tightly held upon the kettle without danger of displacement, and the kettle may be drained easily without the inconvenience that is caused with the use of an ordinary kettle lid or cover. The other advantages of the invention will be obvious from the foregoing, taken in connection with the drawing.

Having thus fully described the invention, what is claimed as new is:—

A kettle lid having a pair of hooks attached thereto at one side for engaging the bead of a kettle upon which the lid is seated, a metallic piece secured upon the marginal portion of the lid opposite said hooks and having a downwardly offset ear arranged in a plane below and parallel with the plane of the margin of said lid, and an eccentric pivoted to the lower surface of said ear to swing in a plane parallel to the marginal portion of said lid and to swing under said bead.

In testimony that I claim the foregoing as my own, I have hereto affixed my signature in the presence of two witnesses.

HENRY JOHNSON.

Witnesses:
WALTER VASEY,
W. J. MOHLMANNE.

Copies of this patent may be obtained for five cents each, by addressing the "Commissioner of Patents, Washington, D. C."